(12) United States Patent
Scofield

(10) Patent No.: US 7,898,431 B1
(45) Date of Patent: Mar. 1, 2011

(54) VARIABLE MISSILE CONFIGURATION—STANDARD TELEMETRY SYSTEM

(75) Inventor: Donald L. Scofield, Ridgecrest, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 06/631,044

(22) Filed: Jul. 16, 1984

(51) Int. Cl.
  *G08C 19/04* (2006.01)
(52) U.S. Cl. .................................. 340/870.11
(58) Field of Classification Search .. 340/870.1–870.11; 128/903; 333/1; 367/76
  See application file for complete search history.

(56) References Cited

U.S. PATENT DOCUMENTS

| | | | |
|---|---|---|---|
| 2,755,161 A | 7/1956 | Rahmel | 346/37 |
| 3,179,355 A * | 4/1965 | Pickering et al. | 364/424 X |
| 3,380,044 A | 4/1968 | Mordwinkin | 340/213 |
| 3,562,728 A | 2/1971 | Cronier | 340/184 |
| 3,636,537 A | 1/1972 | Terry | 340/182 |
| 4,099,240 A | 7/1978 | Rode et al. | 364/571 |
| 4,218,916 A | 8/1980 | Mutziger | 73/359 R |

* cited by examiner

*Primary Examiner* — Thomas H Tarcza
*Assistant Examiner* — Luke D Ratcliffe
(74) *Attorney, Agent, or Firm* — Thomas W. Hennen

(57) ABSTRACT

A standard telemetry system is utilized in conjunction with a variable configuration missile irrespective of the missile configuration test fired. The system includes a common energy source, power supply, transmitter, commutator and signal conditioner. A portion of the telemetry signals produced by each missile configuration is, to an extent, unique to that particular configuration. The system utilizes a different programming connector cable for each missile configuration. The connector cable interfaces telemetry signal producing missile components with the common signal conditioner. The signal conditioner includes all of the circuitry and signal processing components necessary to process all of the telemetry produced by all of the missile configurations. The programming connector cable utilized in conjunction with the test firing of a particular missile configuration routes the telemetry signals produced by that configuration to predetermined input locations on the signal conditioner for appropriate processing and transmission.

5 Claims, 3 Drawing Sheets

VARIABLE MISSILE CONFIGURATION—STANDARD TELEMETRY SYSTEM

BACKGROUND OF THE INVENTION

1. Field of the Invention

This invention relates to telemetry systems for a guided missile. More particularly, it relates to a telemetry system for a guided missile having more than one configuration where each configuration is characterized by the use of a particular fuse in conjunction with a particular guidance control section. With still more particularity, this invention relates to the standardization of a telemetry system for use with a missile having more than one configuration and the consequent reduction of telemetry electronics required to support the test firing of the missile in all of its configurations.

2. Description of the Prior Art

Guided missile test firings may require the inclusion of a telemetry electronics package in the test fired missile by which parameters of interest reflecting the in-flight operation of missile systems are sampled and transmitted to remote locations. Some guided missiles have more than one configuration. Individual configurations are distinguished by the use of a particular fuse in combination with a particular guidance section, each of which generates telemetric data. For example, the AIM-9L and AIM-9M versions of the Navy's Sidewinder missile can be configured to utilize either of two fuses in combination with either of two guidance control sections. Four possible missile configurations result.

Previously, discrete telemetry electronics packages were required for each missile configuration. A portion of the data generated in flight by each of the various missile configurations is data reflecting a parameter of missile operation common to all configurations. This data requires identical signal processing and signal processing components irrespective of the particular missile configuration from which it is generated. A second portion of the telemetric data produced by a missile configuration is data which reflects operational characteristics unique to that particular configuration. This second portion of data heretofore necessitated that each missile configuration have a dedicated and unique telemetry section in order to provide the necessary signal conditioning. Consequently, the particular missile configuration to be test fired was required to be identified significantly in advance of the test firing date in order that the appropriate telemetry system could be fabricated and environmentally qualified for use. Additionally, a large volume of telemetry package components, including the unique signal conditioning electronics required for each missile configuration, were required to be stockpiled at a test facility in order to support the possible test firing of any missile configuration. The necessity to fabricate a telemetry system at a test location in response to the identification of the configuration in which a missile was to be test fired resulted in the inability to test telemetry electronics at their point of manufacture. Quality assurance problems therefore resulted. Further, telemetry system fabrication previously required the soldering of telemetry system components in the field with the result that any repair to a telemetry package after assembly required unsoldering, resoldering and system recertification. Lost time and significant expense resulted.

SUMMARY OF THE INVENTION

Briefly, the telemetry system herein disclosed utilizes one of a plurality of available programming connector cables to route telemetric data generated in a particular fuse and guidance control section combination to predetermined input locations on a signal conditioning electronics component common to each missile configuration. The signal conditioner is a printed circuit card assembly which includes all of the subcircuits and signal processing components necessary to provide appropriate signal processing for all of the telemetric data capable of being generated by all of the fuse and guidance control section combinations with which it is designed to be utilized. A first portion of the signal conditioner subcircuits and components are dedicated subcircuits and components utilized by only one of the fuse and guidance control section combinations. A second portion of the signal conditioner subcircuits and components are common subcircuits and components utilized to process telemetric data where the data generated does not change as a function of missile configuration. Such data commonality may be found in two or more of the possible missile configurations. A third portion of the circuitry and components located on the signal conditioner is shared to the extent that telemetry signals unique to a particular missile configuration are input to the signal conditioner at a single dedicated location, undergo preliminary processing by dedicated components, undergo secondary processing by components utilized to process signals which can originate in more than one configuration, and are routed out of the subcircuit at a common location.

The aforementioned programming connector cables provide appropriate signal routing between a particular fuse and guidance control section combination and predetermined input locations on the signal conditioner. The need for a discrete signal conditioning electronics component for each guided missile configuration is thereby eliminated. The signal conditioner component of the present invention, in addition to providing signal processing, acts as a power distribution medium for an on-board energy source and power supply. A commutator is connected to and receives processed telemetry signals from the signal conditioner. The commutator sequences telemetry signals received from the signal conditioner and routes the sequenced signals back through the signal conditioner to an on-board transmitter and antenna system. Each telemetry system component is connected to the common signal conditioner by pin connectors as opposed to soldered connection facilitating system repair, quality assurance and system reliability.

The use of a different programming connector cable in conjunction with a common signal conditioning electronics package eliminates need for a discrete telemetry electronics package for each missile configuration in a variable configuration missile. Telemetry system component stockpiling and the lead time in which a missile configuration must be identified to permit telemetry system fabrication is greatly reduced. Significant cost savings are realized by the standardization of telemetry system electronics made possible by the use of relatively inexpensive but unique programming connector cables. Further, telemetry system electronics can be tested at their point of manufacture since all of the components necessary for processing the totality of telemetric data produced by all of the configurations of a particular missile are located on a single common circuit card assembly. Quality assurance and system reliability is thereby greatly enhanced.

It is therefore an object of this invention to provide a common telemetry system for a guided missile having more than one configuration.

It is a further object of this invention to provide a common telemetry system for a variable configuration missile having a standard signal conditioning electronics component.

It is a further object of this invention to provide a common telemetry system for a variable configuration missile which provides operational flexibility, is less expensive than previous telemetry systems and provides an enhanced ability to demonstrate system reliability at the lowest level of fabrication.

Other useful objects of this invention will become apparent from the following description when considered in conjunction with the appended drawings.

DESCRIPTION OF THE PREFERRED EMBODIMENT

Figure 1:
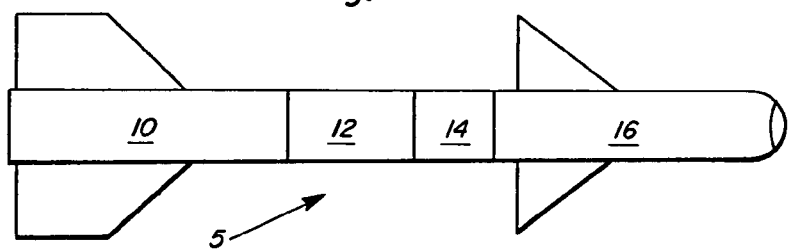
FIG. 1 is a perspective view of a guided missile demonstrating the discrete sections of which it is comprised.

FIG. 1 illustrates a guided missile, such as the Sidewinder air-to-air missile in common use throughout the world. Missile 5 consists of discrete missile sections which include a rocket motor section 10, a warhead section 12, a fuse section 14 and a guidance control section 16. In the case of the Sidewinder missile, one of two available guidance control sections is utilized in conjunction with one of two discrete fuses. It is to be noted that while this description is based upon the Sidewinder missile and relates to a missile having four discrete configurations, the telemetry system herein disclosed is appropriate for use with any variable configuration missile where each configuration produces unique telemetric data.

Figure 2:
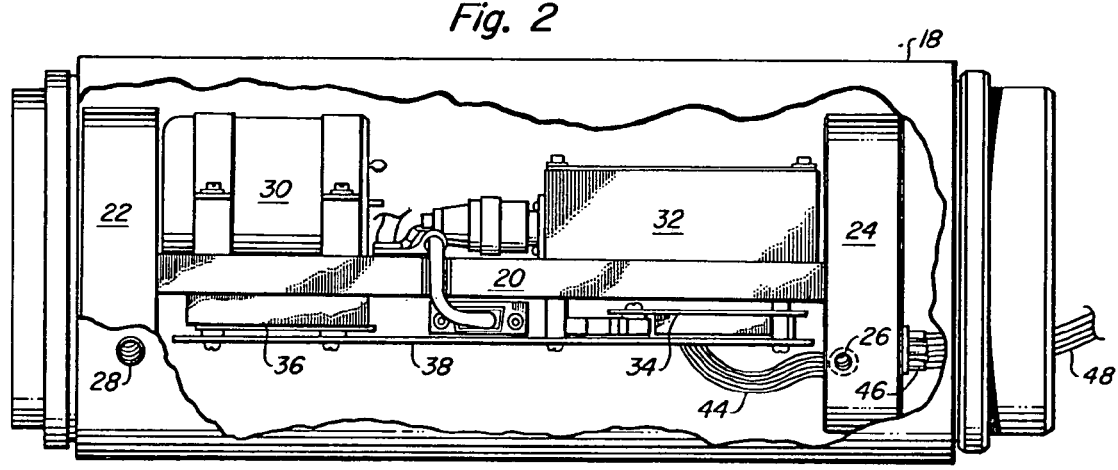
FIG. 2 is a cutaway view of a guided missile telemetry section of the type herein disclosed.

In a test firing scenario, missile warhead section 12 of FIG. 1 is replaced by the telemetry section of FIG. 2 with which it is physically interchangeable. Referring now to FIG. 2, mounted within telemetry section 18 are the telemetry system components necessary to receive, process and transmit the telemetric data produced by the fuse and guidance control section in a guided missile test firing.

Mounting plate 20 is rigidly attached to and supported by disc-shaped bulkheads 22 and 24. Bulkheads 22 and 24 include threaded holes 26 about their circumference into which threaded fasteners are inserted through holes 28 in telemetry section 18. Plate 20 and bulkheads 22 and 24 as assembled provide a mounting frame which is structurally incorporated within the guided missile and which accommodates the mounting of telemetry system components. Mounted on plate 20 are thermal battery 30, transmitter 32, commutator 34, power supply 36 and signal conditioner 38.

Figure 3:
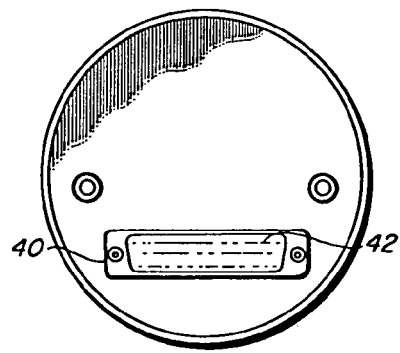
FIG. 3 is an end view of the slotted one of the two disc-shaped bulkheads supporting the mounting frame within the telemetry section of FIG. 2.

Referring concurrently now to FIGS. 2 and 3, bulkhead 24 includes slot-like passage 40, into which connector 42 is inserted and secured. Connector 42 terminates wire bundle 44, the individual wires of which are fixedly attached at predetermined locations to signal conditioner 38. Signal conditioner 38 is a printed circuit card assembly containing all of the subcircuitry and electronics components necessary to properly process all of the telemetric data produced by the missile, regardless of the particular missile configuration fired.

Connector 42 is mated with a compatible connector terminating one end of whichever one of the plurality of programming connector cables is in use in a particular missile firing. On the end of each programming connector cable opposite from the end terminated by the connector compatible with connector 42 connectors are located which mate with connectors in the particular fuse and guidance control section with which the connector cable is utilized. In FIG. 2, programming connector cable 48 includes connector 46 which is compatible and mates with connector 42 and, as shown in FIG. 3, connectors 50 and 52 which mate with connectors 58 and 60 of first fuse 54 and first guidance control section 56 respectively.

Figure 4:
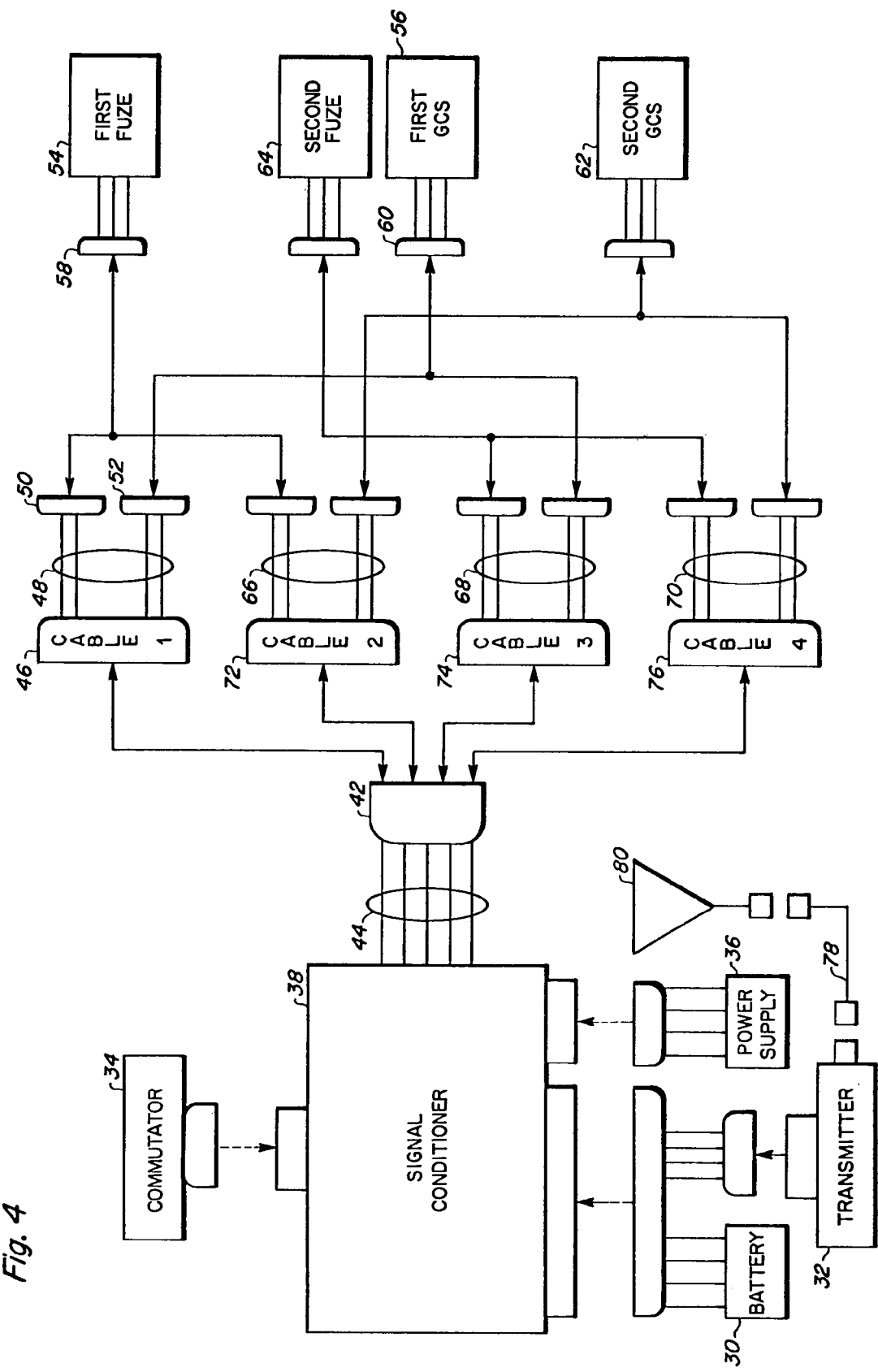
FIG. 4 is a block diagram demonstrating the concept of the telemetry system herein described.

Referring to FIGS. 2, 3 and 4 concurrently, it is seen that programming connector cable 48, in this embodiment, is but one of four available connector cables, the cable utilized in any one missile test firing being selected in accordance with the missile configuration fired. Each programming connector cable provides a unique interface between a particular fuse and guidance control section combination and a common telemetry system electronics component. Connector cable 48 interfaces first fuse 54 and first guidance control section 56 with signal conditioner 38. Similarly, second programming connector cable 66 interfaces first fuse 54 when utilized in conjunction with second guidance control section 62 to signal conditioner 38. Third programming connector cable 68 is utilized to interface the combination of second fuse 64 and first guidance control section 56 to signal conditioner 38. Finally, second fuse 64 and second guidance control section 62 are interfaced to signal conditioner 38 by fourth programming connector cable 70.

In operation, each different fuse and guidance control section combination produces telemetry signals a portion of which are different from the telemetry signals produced by any other fuse and guidance control section combinations and which require unique signal processing. Historically, the production of unique telemetric data by a missile configuration necessitated the existence of a telemetry section unique to that particular configuration. By contrast, the device of the present invention necessitates only the fabrication of a predetermined number of connector cables each of which is individually fabricated for use in conjunction with otherwise common telemetry system components.

In the embodiment herein described, connector 42 is a 50 contact connector. Of these 50 contacts, 45 are connected to individual wires of wire bundle 44. Wire bundle 44 thus includes 45 wires, each of which are attached at a discrete location to signal conditioner 38. Likewise, in this embodiment, connector 46 of connector cable 48 is a 50 contact connector as are connectors 72, 74 and 76 of connector cables 66, 68 and 70 respectively.

That portion of telemetry signals communicated to signal conditioner 38 which is unique to the particular fuse and guidance section combination in use and which requires signal processing unique to that combination is routed through the programming connector cable to predetermined contacts in connector 42. The signals are then routed through wire bundle 44 to dedicated input locations on signal conditioner 38. Input of such a signal at a dedicated location on signal conditioner 38 results in the signal receiving the unique signal processing it requires.

That portion of telemetry signals produced by more than one or all of the fuse and guidance control section combinations and which reflects an operational characteristic common to one or more missile configurations can be processed by common components. This portion of telemetry signals is routed to the same contact location in connector 42 irrespective of the particular fuse and guidance control section combination utilized. Routing is accomplished by the programming connector cable. Once input at a common contact in connector 42 a telemetry signal is conducted to a single input location on signal conditioner 38 and is processed in accordance with the electronic components of signal conditioner 38 to which the input location is connected.

Figure 5:
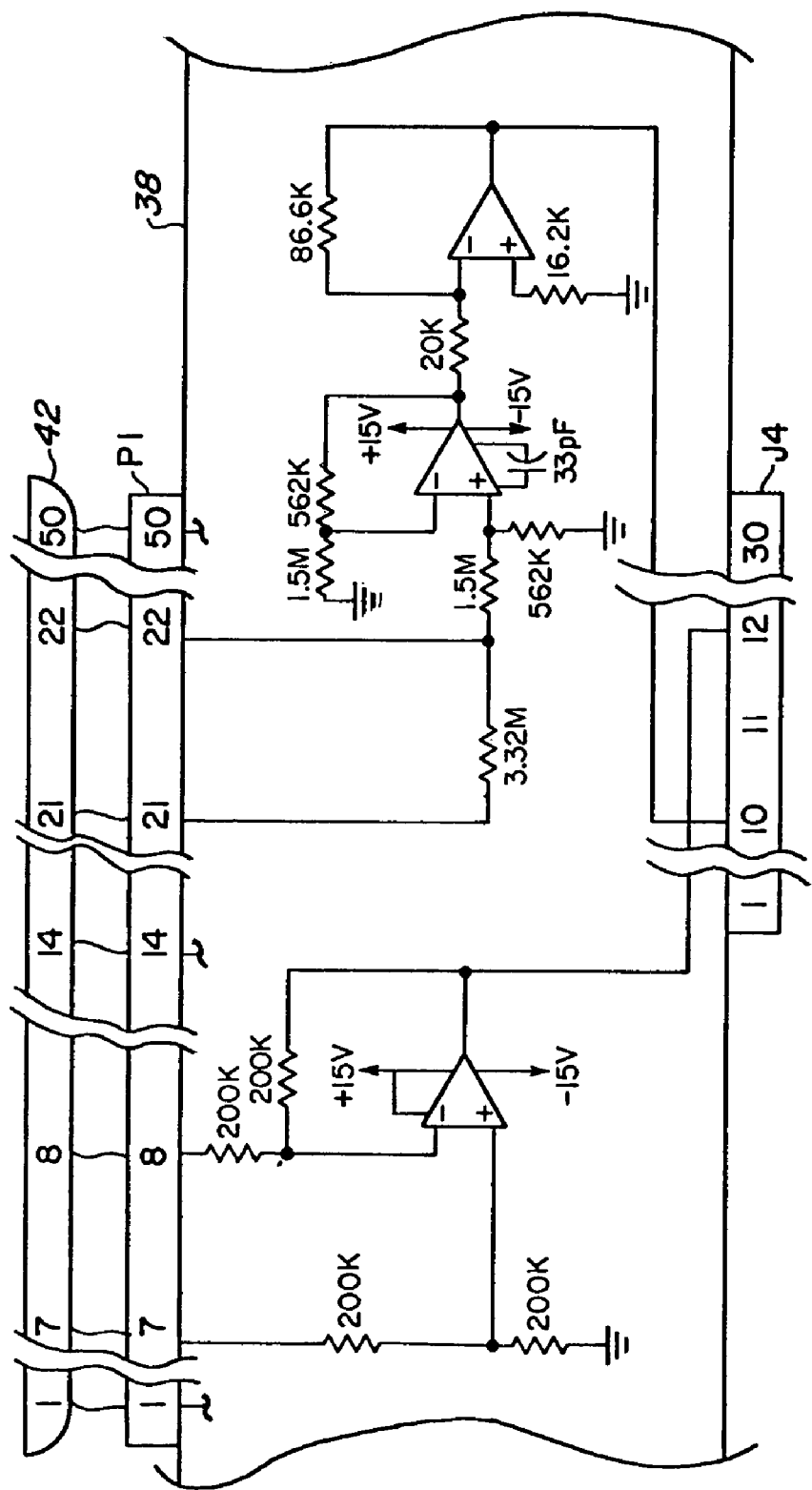
FIG. 5 is a partial circuit diagram demonstrative of a portion of the circuitry located on the signal conditioner of the preferred embodiment of the telemetry system herein described.

Signal conditioner 38 accomplishes signal processing according to the inputs it receives and locations at which those inputs are received. An example of a portion of the circuitry and components located on signal conditioner 38 is illustrated in FIG. 5 for the embodiment herein described. This circuitry is merely demonstrative of how signal processing can be accomplished in an efficient fashion utilizing a common signal conditioning component where previously more than one telemetry system was required.

Referring to FIG. 5, for example, it is seen that an input received at contact point 7 of connector 42 is communicated to location P1-7 on signal conditioner 38. Likewise, an input at contact point 8 of connector 42 is communicated to location P1-8 on signal conditioner 38. In a first missile configuration a telemetry signal is input to signal conditioner 38 at location P1-7 while input location P1-8 is at ground. The output of the subcircuit at output location J4-12 of this subcircuit would be a voltage equal to the quantity (½)(X)(2) where X is the voltage input at location P1-7. In a second missile configuration input location P1-7 is at ground while a telemetry signal is received at location P1-8. The output voltage at output location J4-12 of signal conditioner 38 is a voltage equal to minus the quantity (Y) where Y is the input voltage at location P1-8. A third missile configuration produces telemetry signals which are input at both locations P1-7 and P1-8 and result in an output voltage at output location J4-12 equal to the quantity [(½)(X)(2)(−Y)] where X and Y are the previously mentioned voltages. In a fourth configuration both inputs P1-7 and P1-8 are at ground.

A second multiple input/single output subcircuit is demonstrated in FIG. 5. In this subcircuit the existence of minus eight volts DC at location P1-21 coupled with a zero volts input at location P1-22 results in a plus five volts output at location J4-10. The existence of minus three volts DC at location P1-22 coupled with a zero volt input at location P1-21 results in a plus 4.86 volts DC output at output location J4-12.

As earlier noted, signal conditioner 38 is a printed circuit card assembly containing all of the subcircuits and electronic components necessary to accomplish the required signal processing for all of the telemetric data capable of being produced by the totality of missile configurations. Those skilled in the telemetry arts being cognizant of the telemetry signals produced by the variable configuration missile with which they are concerned and the processing each of such signals requires are fully capable of practicing the present invention by configuring a single signal conditioner component and the required programming connector cables.

Referring once again to FIG. 4, commutator 34 of the preferred embodiment is a 48 channel pulse-amplitude modulated commutator which receives telemetry signals processed by signal conditioner 38, sequences those signals in a predetermined manner and provides those sequenced signals, via signal conditioner 38, to transmitter 32. Thermal battery 30 is an on-board energy source which provides power to telemetry system components. Power is distributed from thermal battery 30 to telemetry system components via circuitry on signal conditioner 38. Sequenced telemetry signals produced by commutator 34 are transmitted to remote receiving locations by transmitter 32 in conjunction with antenna cable 78 and antenna 80. The signals transmitted contain information valid with respect to the fuse and guidance control section from which they originate.

It is clear that many modifications and variations of the present invention are possible in light of the above teachings. It is therefore to be understood that within the scope of the appended claims the invention may be practiced otherwise than as specifically described.

What is claimed is:

1. A telemetry system for use in test firing a guided missile, where said missile has a plurality of configurations distinguished by a unique fuse and guidance control section combination, each of said configurations producing a plurality of characteristic telemetry signals reflecting the operation of said missile configuration and requiring correspondingly unique signal processing prior to being transmitted from said telemetry system, comprising:

common signal conditioning means, for receiving and processing said characteristic telemetry signals from the one of said unique fuse and guidance control section combinations utilized in a missile firing and for producing processed signals which reflect the operation of said utilized combination, said common signal conditioning means compatible for use with any of said plurality of missile configurations;

interface means, connecting said signal conditioning means with the one of said fuse and guidance control sections utilized in a missile firing, for receiving and selectively routing said characteristic telemetry signals produced by said one utilized combination to predetermined locations in said signal conditioning means;

a commutator having said processed telemetry signals produced by said signal conditioning means as an input, said commutator producing a discrete sequence of signals in response to receipt of said processed telemetry signals, said discrete sequence of signals reflecting the operation of said utilized fuse and guidance section combination; and means for transmitting said discrete sequence of signals produced by said commutator to a location remote from said missile.

2. The telemetry system according to claim 1 wherein said interface means comprises a plurality of programming connector cables equal in number to said plurality of missile configurations, each of said plurality of connector cables being compatible for use with and providing unique routing for the telemetry signals characteristic of and produced by one of said fuse and guidance section combinations, the appropriate one of said plurality of programming connector cables being selected for use in a missile firing in accordance with the one of said plurality of missile configurations fired.

3. The telemetry system according to claim 2 wherein said signal conditioning means is a printed circuit card assembly connected to a first connector by a wire bundle and wherein each of said programming connector cables includes a connector compatible for mating with said first connector, the mating of said first connector with the compatible connector of a connector cable completing a plurality of electrical paths between a utilized fuse and guidance section and said circuit card assembly, a different portion of said electrical paths being utilized dependent on the one of said plurality of connector cables with which said first connector is mated, said circuit card including a plurality of subcircuits, a predetermined portion of said subcircuits being dedicated subcircuits utilized in conjunction with only one of said missile configurations and a predetermined portion of said subcircuits being common subcircuits utilized in conjunction with more than one of said missile configurations, each of said subcircuits receiving, in use, a telemetric input signal along at least one of said electrical paths and processing said received signal to reflect a facet of operation of one of said fuse and guidance section combinations.

4. The telemetry system according to claim 3 further comprising a mounting frame, an on-board energy source and a power supply, said commutator, energy source, power supply, signal conditioning means and means for transmitting said commutator produced signals all being mounted on said mounting frame and said commutator, said energy source, said power supply and said means for transmitting all being connected to said signal conditioning by pin connectors.

5. The telemetry system according to claim 4 wherein said energy source is a thermal battery and said commutator is a pulse-amplitude modulated commutator.

* * * * *